Patented Dec. 19, 1944

2,365,209

UNITED STATES PATENT OFFICE 2,365,209

BENEFICIATED MINERAL OILS

John M. Musselman, South Euclid, Ohio, assignor to The Standard Oil Company, Cleveland, Ohio, a corporation of Ohio No Drawing. Application October 23, 1940, Serial No. 362,433

12 Claims. (Cl. 252—33)

In my patent application Serial No. 346,218, filed July 17, 1940, there is set forth the preparation of improved oils with the reaction product of a sulphide of phosphorus on a wax or ester of higher monohydric alcohol and fatty acid. I have now found that such reaction products of phosphorus sulphide on waxes in conjunction with the salt of an oxy-sulphur acid, results in different and much greater advantages than are attainable with either of the materials alone, or such as would be expected from a mere additive effect of the substances.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The oil for the base of the lubricant may be of desired character and source, depending upon the particular duty in view, and for instance may be of 45 to 200 sec. viscosity Saybolt Universal at 210° F., and of a Mid-Continent or other source. With the oil there is incorporated a salt of an oxy-sulphur acid and a reaction product of a phosphorus sulphide on a wax. The salt of the oxy-sulphur acid, that is alkyl sulphuric or sulphonic acid, is of the general formula $R.SO_n.R'$, wherein R is an alkyl or halogen-substituted radical, $n$ is 4, and R' is a base (e. g., lead, aluminum, tin, magnesium or alkaline earth metal, sodium or alkali metal, ammonia or an amine). The alkyl sulphuric acid salts are especially advantageous. Mixtures of alkyl sulphates may be employed, and mixtures are particularly easily had in practice. Especially desirable are the compounds derivable from coconut fatty oil alcohols by separation and reduction and treatment with sulphuric acid in suitable form, and of these the lauryl compounds are outstanding. The reaction product of a phosphorus sulphide may be prepared from phosphorus pentasulphide, and a wax, as for instance wool wax, degras, beeswax, sperm oil, Chinese wax, Japan wax, carnauba wax, etc. The oxy-sulphur salt and the reaction product of the phosphorus sulphide and wax dissolve suitably in the oils to be used, and they may be incorporated in suitable amounts for a particular duty in view. Thus, for internal combustion engine oils, the amount of the reaction product of phosphorus sulphide on wax may be 0.05–25.0 per cent, and the amount of salt of oxy-sulphur acid may be similarly 0.01–1.0 per cent. For Diesel engines, the amount, particularly of the first-mentioned ingredient may be to advantage 2.0 per cent. Where the oil is not to be subjected to such drastic heat, the lesser amounts of both agents may be employed, as 1 per cent of the reaction product. For such service as lubrication of hypoid type gears however, the phosphorus sulphide reaction product of the wax may be considerably increased, as to 10–20 per cent, and in grease usages its amount generally may be very large. The phosphorus sulphide reaction product of the wax may be prepared by suitable procedure, as for instance by the process set forth in my aforesaid patent application.

As an example: With a lubricating oil of S. A. E. 20 Mid-Continent stock there is incorporated 0.5 per cent of the reaction product of phosphorus pentasulphide on degras, and 0.5 per cent of sodium lauryl sulphate.

As another example: With a similar lubricating oil there is incorporated 0.15 per cent of sodium lauryl sulphate and 10 per cent of the reaction product of phosphorus pentasulphide on wool wax or beeswax.

Other modes of applying the principle of the invention may be employed, change being made as regards the details described, provided the features stated in any of the following claims, or the equivalent of such, be employed.

I therefore particularly point out and distinctly claim as my invention:

1. A lubricant, comprising a mineral oil and sodium lauryl sulphate and the reaction product of phosphorus pentasulphide on degras.

2. A lubricant, comprising a mineral oil and a hexyl sulphate and the reaction product of phosphorus pentasulphide on sperm oil.

3. A lubricant, comprising a mineral oil and an octyl sulphate and the reaction product of phosphorus pentasulphide on beeswax.

4. A lubricant, comprising a mineral oil and a salt of an oxy-sulphur acid of the formula $R.SO_4.R'$, where R is an alkyl or halogen-substituted alkyl radical, and R' is a base, and the reaction product of a phosphorus sulphide on an ester wax.

5. A lubricant, comprising a mineral oil and a salt of a sulphated alcohol derived from coconut oil fatty acids and the reaction product of phosphorus pentasulphide on degras.

6. A lubricant, comprising a mineral oil and a salt of a sulphated alcohol derived from coconut oil fatty acids and the reaction product of phosphorus pentasulphide on sperm oil.

7. A lubricant, comprising a mineral oil and a salt of a sulphated alcohol derived from coconut oil fatty acids and the reaction product of phosphorus pentasulphide on beeswax.

8. A lubricant, comprising a mineral oil and a salt of a sulphated alcohol derived from coocnut oil fatty acids and the reaction product of phosphorus pentasulphide on an ester wax.

9. A lubricant, comprising a mineral oil and sodium lauryl sulphate and the reaction product of phosphorus pentasulphide on an ester wax.

10. A lubricant, comprising a mineral oil and a hexyl sulphate and the reaction product of phosphorus pentasulphide on an ester wax.

11. A lubricant, comprising a mineral oil and an octyl sulphate and the reaction product of phosphorus pentasulphide on an ester wax.

12. A lubricant, comprising a mineral oil and a salt of an oxy-sulphur acid of the formula $R.SO_n.R'$, wherein R is an alkyl or halogen-substituted alkyl radical, $n$ is 4, and R' is a base, and the reaction product of a phosphorus sulphide on degras.

JOHN M. MUSSELMAN.